J. H. SAGER.
BUMPER FOR AUTOMOBILES.
APPLICATION FILED DEC. 30, 1912.

1,108,626.

Patented Aug. 25, 1914.

Witnesses:
Clarence W. Carroll
D. Gurnee

Inventor:
James H. Sager
by his attorneys
Osgood, Davis & Dorsey

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER FOR AUTOMOBILES.

1,108,626.	Specification of Letters Patent.	Patented Aug. 25, 1914.

Application filed December 30, 1912. Serial No. 739,337.

*To all whom it may concern:*

Be it known that I, JAMES H. SAGER, a citizen of the United States, and resident of Rochester, in the county of Monroe and State of New York, have invented certain new and useful Improvements in Bumpers for Automobiles, of which the following is a specification.

This invention relates to automobile-bumpers of the type in which a bumper-bar is supported, in transverse horizontal position, in front of the front-wheels of an automobile.

The object of the invention is to produce an automobile-bumper, of the type in question, in which the bumper-bar is supported by means, of novel and simple form, applicable particularly to automobiles of the type in which the side frame-members do not project at the front of the automobile in such position or form as to be adapted to support the bumper.

To this end my novel bumper is provided with supporting-means adapted to be attached, conveniently and securely, to a transverse frame-member at the front of the automobile, in the manner hereinafter described.

Figure 1:
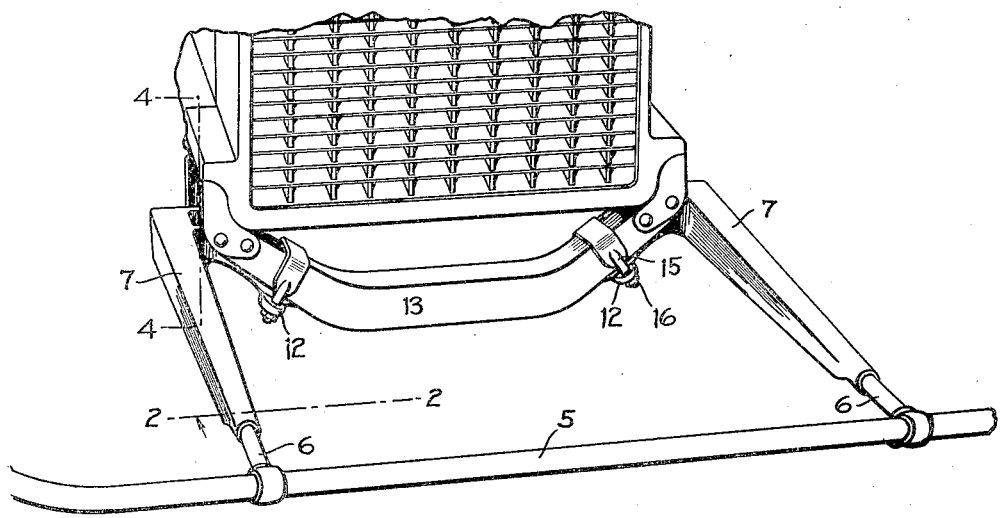
Figure 2:
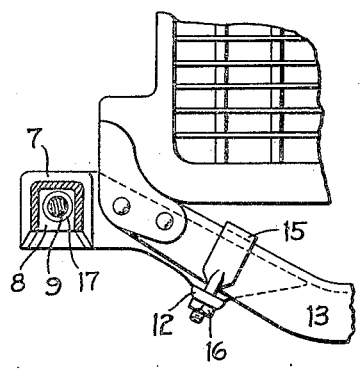
Figures 3, 4:
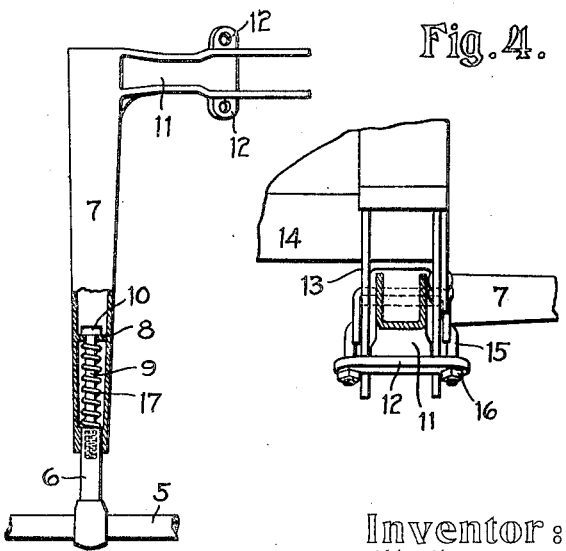

In the accompanying drawings:—Figure 1 is a front-perspective view of a bumper embodying the present invention, together with a portion of an automobile upon which the bumper is shown as mounted; Fig. 2 is a partial front-elevation, on a larger scale than Fig. 1, and in section on the line 2—2 in the latter figure; Fig. 3 is a plan-view, partly in section, showing one of the bumper-supports and the adjacent portion of the bumper-bar; and Fig. 4 is a detail-view, in section on the line 4—4 in Fig. 1, illustrating particularly the manner in which the supporting-member of the bumper is connected with the transverse frame-member of the automobile.

The invention is illustrated as embodied in a bumper having the usual transverse bumper-bar 5, which is supported upon horizontal plungers 6. These plungers slide through the forward ends of forwardly-projecting arms 7, constituting portions of the supporting-members for the bumper-bar. The arms 7 are of channel-form in cross-section, as shown in Fig. 2, and they are provided with transverse partitions 8, which are perforated to receive rods 9 threaded into, and projecting rearwardly from, the plungers 6. The rods 9 slide freely through the partitions 8, and compression-springs are interposed between the plungers and the partitions so as to support the plungers but permit the bumper-bar and the plungers to yield rearwardly when subjected to shocks. The rods 9 have heads 10 which limit the forward movement of the parts.

The rear-portion of each of the supporting members comprises an arm 11, which extends transversely and inwardly from the arm 7, and may be cast integrally therewith. The arm 11 is preferably made of channel-shape, with its open side directed upwardly, as shown in the drawings. This arm 11 is adapted to be attached to a transverse frame-member of the automobile. In automobiles of a well-known form it is common to employ a forward transverse frame-member in the form of a downwardly-opening channel-bar, which constitutes a support for a transverse semi-elliptical spring, and the bumper of the present invention is illustrated as adapted for application to an automobile of this type. The arm 11 is formed to lie within the channel of the frame-member 13 so as to be substantially concealed thereby, and it constitutes a rigid and secure means for mounting the bumper in place, owing to the fact that it is embraced on three sides by the frame-member.

To secure the arm 11 in the frame-member it is provided with integral forwardly- and rearwardly-projecting lugs 12, which are perforated to receive the ends 15 of fastening-devices of the form commonly designated as "Concord clips." The ends of the clips pass through the lugs 12 and are provided with the usual nuts 16, by which the clips are drawn tightly against the top of the frame-member 13.

When the bumper-supports are secured to the frame-member 13 in the manner just described, it is impossible for it to move either forwardly or rearwardly, owing to the fact that the arms 11 are embraced by the frame-member, and transverse movement of the bumper is also effectually prevented by engagement of the arms 7 with the ends of the frame-member 13. Angular or swinging movement of the bumper-bar in a vertical direction is prevented by the engagement of the two spaced edges of each arm 11 with the inner surface of the frame-member. The construction just described provides, therefore, in a simple and inexpensive manner, a bumper which may be readily applied to an automobile-frame of the type in question, and which is securely held thereon against accidental movement in any direction.

I claim:—

1. An automobile-bumper having, in combination, a bumper-bar, supports for the bar comprising arms extending rearwardly therefrom, and arms extending transversely and inwardly from the rear-ends of said rearwardly-extending arms, the inwardly-extending arms being adapted to lie within a channel-shaped transverse frame-member of an automobile, and means for clamping the inwardly-extending arms within the channel of said frame-member.

2. An automobile-bumper having, in combination, a bumper-bar, supports for the bar comprising hollow members extending rearwardly therefrom, and channel-shaped upwardly-opening transverse inwardly-directed arms extending integrally from the rear-portions of said rearwardly-extending members and adapted to lie within a channel-shaped transverse frame-member of an automobile, and clips adapted to surround said frame-member and clamp said arms therein.

JAMES H. SAGER.

Witnesses:
C. S. DAVIS,
D. GURNEE.